United States Patent
Younger

(10) Patent No.: US 7,762,918 B2
(45) Date of Patent: Jul. 27, 2010

(54) ACCUMULATOR ORIFICE PLATE FOR AUTOMATIC TRANSMISSION

(76) Inventor: Steven W. Younger, 2811 Oboe Cir., Hacienda Heights, CA (US) 91745

( * ) Notice: Subject to any disclaimer, the term of this patent is extended or adjusted under 35 U.S.C. 154(b) by 323 days.

(21) Appl. No.: 12/101,027

(22) Filed: Apr. 10, 2008

(65) Prior Publication Data
US 2009/0258745 A1    Oct. 15, 2009

(51) Int. Cl.
*F16H 31/00* (2006.01)
(52) U.S. Cl. .................................................. 475/129
(58) Field of Classification Search ................. 475/129; 477/150
See application file for complete search history.

(56) References Cited

U.S. PATENT DOCUMENTS

| | | | | |
|---|---|---|---|---|
| 4,665,774 A | * | 5/1987 | Oguri .......................... | 477/150 |
| 4,867,194 A | * | 9/1989 | Hayasaki et al. ....... | 137/118.06 |
| 4,911,036 A | * | 3/1990 | Ueki et al. ................... | 477/150 |
| 5,033,331 A | * | 7/1991 | Takada et al. ............... | 477/150 |
| 5,038,637 A | * | 8/1991 | Sugano ........................ | 477/150 |
| 5,125,295 A | * | 6/1992 | Iwatsuki et al. ............. | 477/150 |
| 5,393,273 A | * | 2/1995 | Haka ........................... | 475/129 |
| 5,882,273 A | * | 3/1999 | Jang ............................ | 475/129 |

\* cited by examiner

*Primary Examiner*—Dirk Wright
(74) *Attorney, Agent, or Firm*—Kenneth L. Green

(57) ABSTRACT

A modified automatic transmission includes a simple and inexpensive accumulator orifice plate residing between a valve control body and a second gear accumulator. The accumulator is in parallel fluid communication with a second gear servo and moderates changes to pressure of transmission fluid flowing to the second gear servo to reduce or eliminate harsh shifting. The accumulator is also in fluid communication with an Electronic Pressure Control (EPC) accumulator valve which provides an opposing transmission fluid flow into the accumulator to provide faster or firmer shifting when desired. The accumulator orifice plate includes orifices aligned with passages carrying the transmission fluid flows into the accumulator thereby restricting the flows. The orifices have specific sizes to limit the transmission fluid flows into the accumulator and thereby customize the shifting characteristics to suit an individual driver's preferences and/or needs and stabilizing pressure changes due to the EPC accumulator valve.

10 Claims, 4 Drawing Sheets

ACCUMULATOR ORIFICE PLATE FOR AUTOMATIC TRANSMISSION

BACKGROUND OF THE INVENTION

The present invention relates to automatic transmissions and in particular to control of flows into an accumulator.

Automatic transmissions include a number of cooperating mechanical and fluid mechanical elements to achieve a desired goal. The input and output of the automatic transmissions are coupled by a number of in-series planetary gear sets. The planetary gear sets reside inside drums and the mechanical ratio through a planetary gear set changes depending on whether the drum is free to rotate, or held fixed. Gear selection of automatic transmissions is made by selectively tightening and releasing bands residing around drums.

The bands are tightened on the drums by hydraulically operated band servos receiving automatic transmission fluid under pressure. If the servo operates too quickly, the bands stop the drum too quickly, the transmission may shift harshly, possibly damaging parts, and providing an unpleasant sensation to occupants of the vehicle. In order to prevent this event, automatic transmissions include accumulators. An accumulator is a device hydraulically connected to the flow of automatic transmission fluid to the servo. The accumulator includes a piston or equivalent device which moves in response to a change in pressure of the automatic transmission fluid to dampen changes in pressure. For example, the accumulator may be a simple cylinder and piston with springs biasing the piston to a neutral position in the cylinder. When an abrupt change in pressure occurs in the flow of automatic transmission fluid to the servo, the piston moves in the accumulator to dampen the response of the servo, and thereby reduce the harshness of the shift. Unfortunately, different drivers and different uses of vehicles are not always suited to the degree of damping provided by the accumulator. A simple inexpensive solution is not available and as a result, drivers must live with undesirable shift characteristics because no simple and inexpensive means are available to adjust the damping.

Additionally, the accumulator is also in fluid communication with an Electronic Pressure Control (EPC) accumulator valve which provides an opposing transmission fluid flow into the accumulator to provide faster or firmer shifting when desired. Unfortunately the flow through the EPC accumulator valve is not moderated and in some instances results in an abrupt change in pressure to the band servos causing harsh shifting.

BRIEF SUMMARY OF THE INVENTION

The present invention addresses the above and other needs by providing a modified automatic transmission which includes a simple and inexpensive accumulator orifice plate residing between a valve control body and an accumulator. The accumulator is in parallel fluid communication with a second gear servo and moderates changes to pressure of transmission fluid flowing to the second gear servo to reduce or eliminate harsh shifting. The accumulator is also in fluid communication with an Electronic Pressure Control (EPC) accumulator valve which provides an opposing transmission fluid flow into the accumulator to provide faster or firmer shifting when desired. The accumulator orifice plate includes orifices aligned with passages carrying the transmission fluid flows into the accumulator thereby restricting the flows. The orifices have specific sizes to limit the transmission fluid flows into the accumulator and thereby customize the shifting characteristics to suit an individual driver's preferences and/or needs and stabilizing pressure changes due to the EPC accumulator valve.

In accordance with one aspect of the invention, there is provided a modified automatic transmission. The modified automatic transmission includes an automatic transmission main pump, a second gear band servo, second gear bands actuated by the second gear band servo, a second gear drum selectively grasped and released by the second gear bands to shift the automatic transmission, an automatic transmission fluid flow under pressure pumped by the main pump, a second gear accumulator comprising, a control valve body, and an accumulator orifice plate residing between the accumulator and the control valve body. The second gear accumulator includes a first accumulator chamber inside the accumulator, a second accumulator chamber inside the accumulator and separated from the first accumulator chamber and dividing the interior of the accumulator into two mutually exclusive opposing volumes, a first passage in fluid communication with the first chamber, and a second passage in fluid communication with the second chamber. The control valve body includes a second gear shift valve, a first fluid path carrying the automatic transmission fluid flow from the main pump to the shift valve, a first controlled automatic transmission fluid flow controlled by the shift valve, in-series second fluid path and third fluid path carrying the first controlled automatic transmission fluid flow from the shift valve to the second gear band servo, a fourth fluid path in-series with the second fluid path and the first passage and carrying the first controlled automatic transmission fluid flow from the shift valve to the first accumulator chamber, an Electronic Pressure Control (EPC) accumulator valve, a fifth fluid path carrying the automatic transmission fluid flow from the main pump to the EPC accumulator valve, a second controlled automatic transmission fluid flow controlled by the EPC accumulator valve, and a sixth fluid path in fluid communication with the second passage and carrying the second controlled automatic transmission fluid flow from the EPC accumulator valve to the second accumulator chamber. The accumulator orifice plate includes a first orifice aligned with the first passage and having a first diameter between approximately 0.02 inches and approximately 0.09 inches to restrict the flow of the first controlled automatic transmission fluid into the first chamber, and a second orifice aligned with the second passage and having a second diameter between approximately 0.02 inches and approximately 0.09 inches to restrict the flow of the second controlled automatic transmission fluid into the second chamber.

In accordance with another aspect of the invention, there is provided a method for modifying an automatic transmission to match shifting characteristics to a driver's preferences. The method includes removing an oil pan from an automatic transmission to expose a control valve body, removing fasteners attaching an accumulator to the control valve body, removing the accumulator from the control valve body to expose first and second passages between the control valve body and the accumulator, positioning an accumulator orifice plate between the accumulator and the control valve body to align first and second orifices with the passages, repositioning the accumulator against the control valve body, reattaching the fasteners to hold the accumulator and accumulator orifice plate in position, and reattaching the automatic transmission oil pan.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
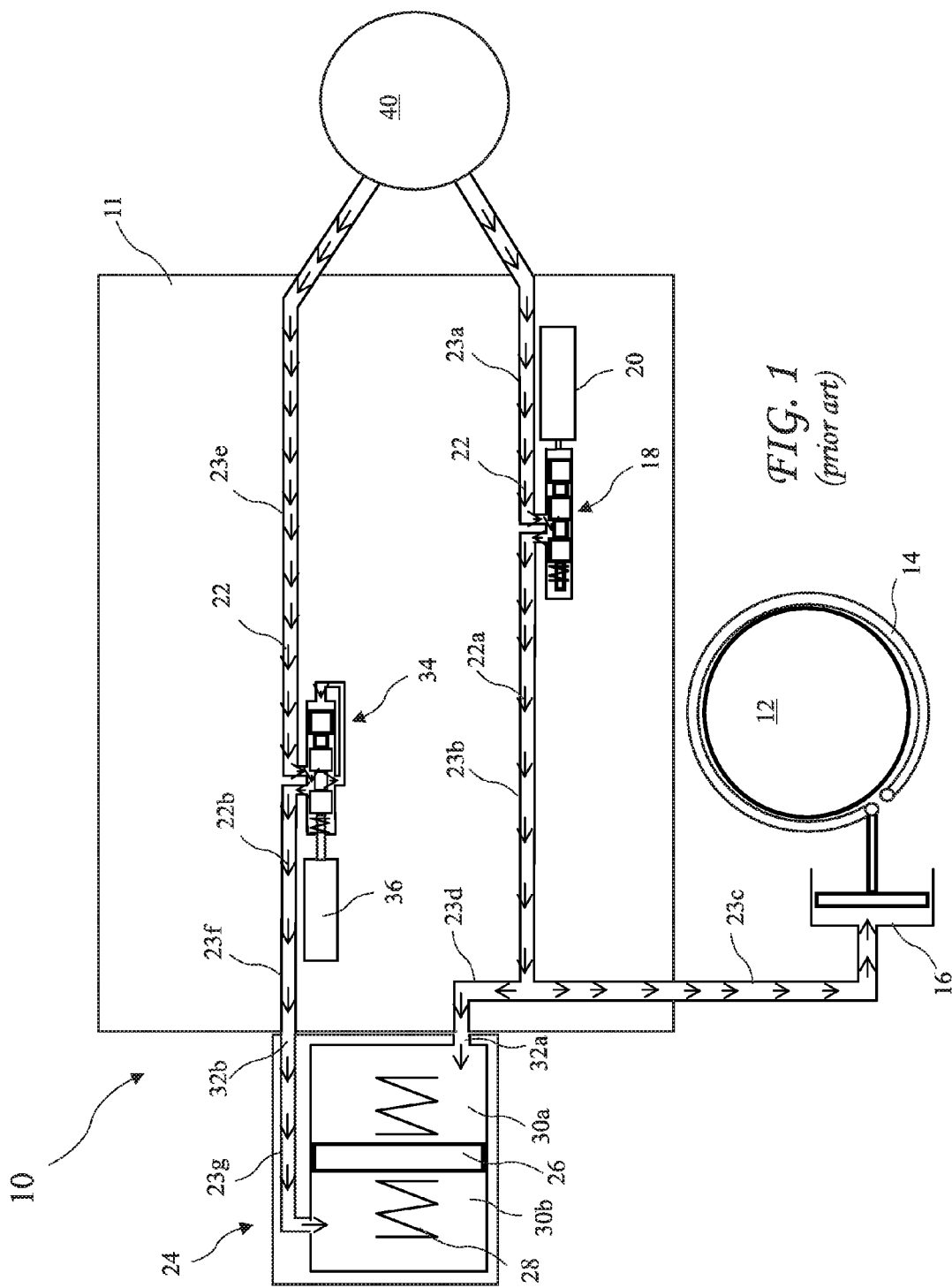
FIG. 1 is a prior art hydro-mechanical mechanism for controlling shifting of an automatic transmission.

A prior art hydro-mechanical mechanism 10 for controlling shifting of an automatic transmission is shown in FIG. 1. The hydro-mechanical mechanism 10 includes a second gear drum 12 housing a planetary gear set. Second gear bands 14 reside over the second gear drum 12 and a second gear band servo 16 is connected to the second gear bands 14 to grasp and release the second gear bands 14 on the second gear drum 12 to change the gear ratio through the planetary gear set. A shift valve 18 regulates a transmission fluid flow 22 provided by a main pump 40 through a first fluid path 23a in the automatic transmission to create the first controlled transmission fluid flow 22a. The second gear band servo 16 is actuated by the first controlled transmission fluid flow 22a received through in-series second fluid path 23b and third fluid path 23c. A shift solenoid 20 controls the shift valve 18.

A second gear accumulator 24 is connected to a fourth fluid path 23d connected in-series with the second fluid path 23b to the shift valve 18 providing parallel flows of the first controlled transmission fluid flow 22a to the second gear accumulator 24 and to the second gear band servo 16 to moderate the grasping of the second gear drum 12 by the second gear bands 14. The second gear accumulator 24 contains a piston 26 and spring 28. When the shift valve 18 opens, part of the initial flow of the first controlled transmission fluid flow 22a diverts through a first accumulator passage 32a to first chamber 30a of the second gear accumulator 24 thus moderating the second gear bands 14 grasping of the second gear drum 12.

A parallel fluid path comprising a fifth fluid path 23e, an Electronic Pressure Control (EPC) accumulator valve 34, and a sixth fluid path 23f fluidly connecting the main pump 40 to a second passage 32b into the second gear accumulator 24. The EPC accumulator valve 34 receives the transmission fluid flow 22 from the main pump 40 and provides a second controlled transmission fluid flow 22b to the passage 32b. The second controlled transmission fluid flow 22b passes through a seventh flow path 23g in the second gear accumulator 24 and into a second chamber 30b of the second gear accumulator 24. The second chamber 30b is on an opposite side of the piston 26 from the first side 30a and is separated from the first accumulator chamber by the accumulator piston 26 and divides the interior of the accumulator into 24 two mutually exclusive opposing volumes, and thereby creates pressure on the piston 26 which resists the flow of the first controlled transmission fluid flow 22a into the second gear accumulator 24 to increase the speed of second gear bands 14 grasping the second gear drum 12. The EPC accumulator valve 34 is preferably controlled by a solenoid 36. The solenoids, valves, and fluid paths are generally integrated into a control valve body 11.

Unfortunately, the flows of the first controlled transmission fluid flow 22a into the second gear accumulator 24 and the flow of the second controlled transmission fluid flow 22b into the accumulator are commonly not adjustable to suit a driver's needs or desires, and no simple and inexpensive means are available to control the flows.

Figures 2A, 2B:
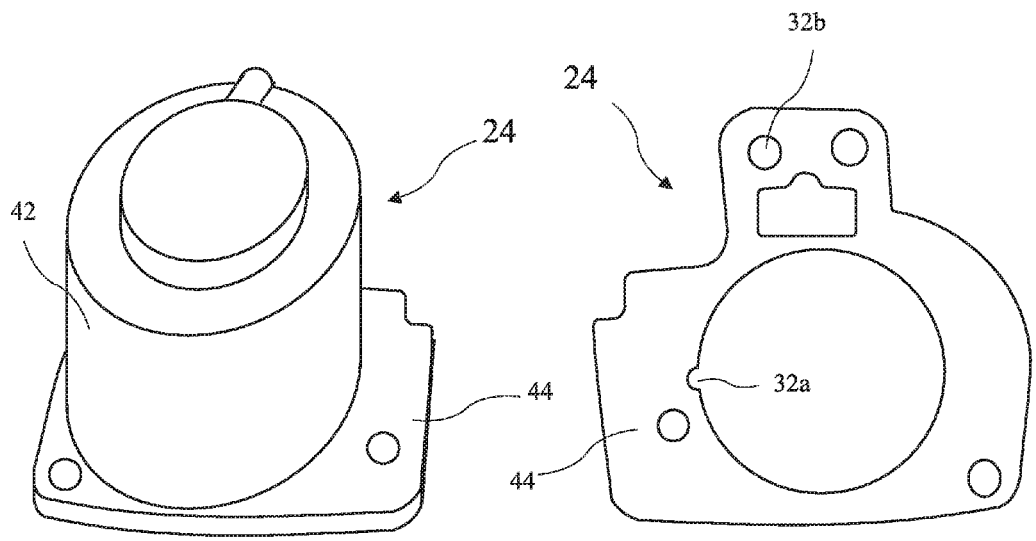
FIG. 2A shows a top front perspective view of an accumulator of the automatic transmission.
FIG. 2B shows a bottom view of the accumulator of the automatic transmission.

A top front perspective view of a known accumulator is shown in FIG. 2A and a bottom view of the second gear accumulator 24 is shown in FIG. 2B. The second gear accumulator 24 includes an accumulator flange 44 for mounting the second gear accumulator 24 to the control valve body 11 (see FIG. 1). The passages 32a and 32b allow the controlled transmission fluid flows 22a and 22b to enter the second gear accumulator 24. Both passages 32a and 32b are large compared to flow rates and provide no effective restriction to the controlled transmission fluid flows 22a and 22b.

Figures 3A, 3B:
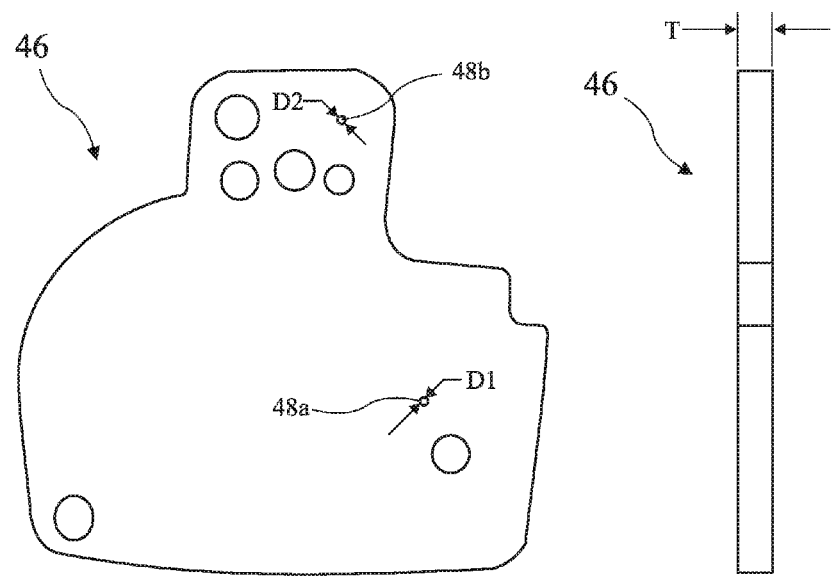
FIG. 3A shows a top view of an accumulator orifice plate according to the present invention.
FIG. 3B shows an edge view of the accumulator orifice plate according to the present invention.

A top view of an accumulator orifice plate 46 according to the present invention is shown in FIG. 3A and an edge view of the accumulator orifice plate 46 according to the present invention is shown in FIG. 3B. The accumulator orifice plate 46 includes a first orifice 48a which over laps the first passage 32a and a second orifice 48b which over laps the second passage 32b. The orifices 48a and 48b are preferably less than 0.140 inches across their largest dimension, and more preferably are round with diameters D1 and D2 between approximately 0.02 inches and approximately 0.09 inches respectively to restrict the flow of the controlled automatic transmission fluids 22a and 22b into the chambers 30a and 30b respectively. The accumulator orifice plate 46 has a thickness T of preferably between approximately 0.020 inches and approximately 0.035 inches and is preferably made of cold roll steel or aluminum.

Figure 4:
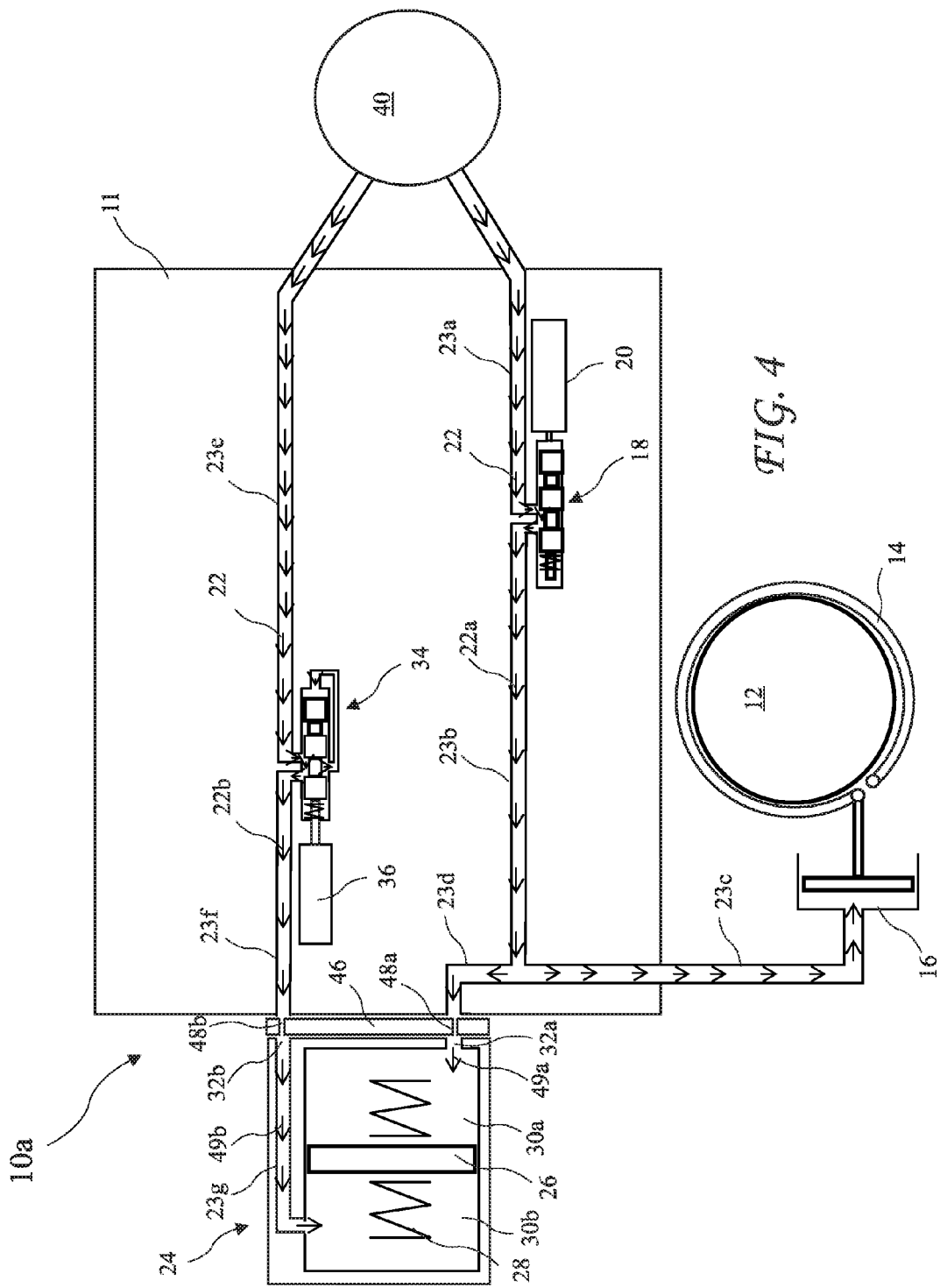
FIG. 4 is a hydro-mechanical mechanism including the accumulator orifice plate according to the present invention for controlling shifting of the automatic transmission.

A hydro-mechanical mechanism 10a including the accumulator orifice plate 46 according to the present invention is shown in FIG. 4. The accumulator orifice plate 46 restricts or limits the flow of the controlled automatic transmission fluids 22a and 22b into the chambers 30a and 30b respectively. By selecting the sizes (or areas) of the orifices 48a and 48b, the damping provided by the second gear accumulator 24 may be modified to a driver's preferences and stabilizing pressure changes due to the EPC accumulator valve 34. While other means may be employed to restrict or limit the flow of the controlled automatic transmission fluids 22a and 22b into the chambers 30a and 30b, the accumulator orifice plate 46 according to the present invention provides a simple and very low cost solution. Further, the orifices 48a and 48b may be modified (e.g., drilled out) to larger sizes to experiment, and because of the very low cost of the accumulator orifice plate 46, little is lost if the orifices are drilled to too large a size and require replacing.

The accumulator orifice plate 46 is particularly well suited to modifying the first to second gear shifting of a General Motors® 4L60E automatic transmission. In other instances the second gear valve 18, the second gear drum 12, and the second gear accumulator 24 may be a valve, drum, and accumulator for any gear of an automatic transmission benefitting from a the addition of a simple and inexpensive accumulator orifice plate between the accumulator and the valve body and the application of the methods of the present invention to any gear of any automatic transmission is intended to come within the scope of the present invention.

Figure 5:
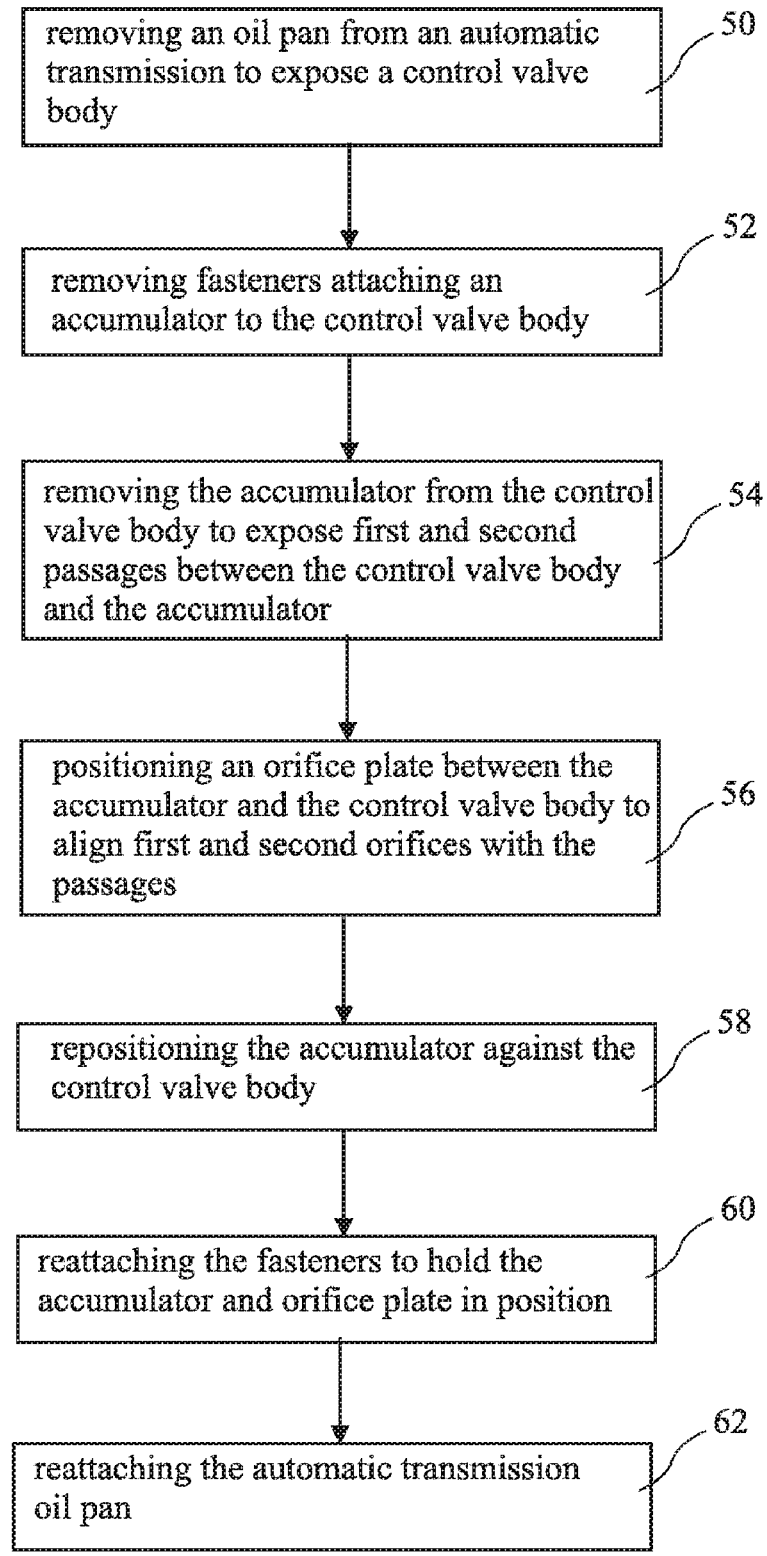
FIG. 5 describes a method for modifying an automatic transmission to match shifting characteristics to a driver's preferences.

A method for modifying an automatic transmission to match shifting characteristics to a driver's preferences is described in FIG. 5. The method includes removing an oil pan from an automatic transmission to expose a control valve body at step 50, removing fasteners attaching a second gear accumulator to the control valve body at step 52, removing the second gear accumulator from the control valve body to expose first and second passages between the control valve body and the second gear accumulator at step 54, positioning an accumulator orifice plate between the second gear accumulator and the control valve body to align first and second orifices with the passages at step 56, repositioning the second gear accumulator against the control valve body at step 58, reattaching the fasteners to hold the second gear accumulator and accumulator orifice plate in position at step 60, and reattaching the automatic transmission oil pan at step 62.

While the invention herein disclosed has been described by means of specific embodiments and applications thereof, numerous modifications and variations could be made thereto by those skilled in the art without departing from the scope of the invention set forth in the claims.

I claim:

1. A modified automatic transmission comprising:
   a main pump;
   a band servo;
   bands actuated by the band servo;
   a drum selectively grasped and released by the bands to shift the automatic transmission;
   an automatic transmission fluid flow under pressure pumped by the main pump;
   an accumulator comprising;
      a first accumulator chamber inside the accumulator; and
      a second accumulator chamber inside the accumulator and separated from the first accumulator chamber and dividing the interior of the accumulator into two mutually exclusive opposing volumes;
      a first passage in fluid communication with the first chamber; and
      a second passage in fluid communication with the second chamber;
   a control valve body including:
      a shift valve;
      a first fluid path carrying the automatic transmission fluid flow from the main pump to the shift valve;
      a first controlled automatic transmission fluid flow controlled by the shift valve;
      in-series second fluid path and third fluid path carrying the first controlled automatic transmission fluid flow from the shift valve to the band servo;
      a fourth fluid path in-series with the second fluid path and the first passage and carrying the first controlled automatic transmission fluid flow from the shift valve to the first accumulator chamber;
      a second valve;
      a fifth fluid path carrying the automatic transmission fluid flow from the main pump to the second valve;
      a second controlled automatic transmission fluid flow controlled by the second valve; and
      a sixth fluid path in fluid communication with the second passage and carrying the second controlled automatic transmission fluid flow from the second valve to the second accumulator chamber;
   an accumulator orifice plate residing between the accumulator and the control valve body and including:
      a first orifice aligned with the first passage and having a first small cross-section to restrict the flow of the first controlled automatic transmission fluid into the first chamber; and
      a second orifice aligned with the second passage and having a second small cross-section to restrict the flow of the second controlled automatic transmission fluid into the second chamber.

2. The modified automatic transmission of claim 1, wherein an accumulator piston resides inside the accumulator and separates the first chamber from the second chamber.

3. The modified automatic transmission of claim 1, wherein the drum is a second gear drum, the bands are second gear bands, and the accumulator is a second gear accumulator.

4. The modified automatic transmission of claim 1, wherein the first orifice and the second orifice are round and have diameters smaller than approximately 0.14 inches.

5. The modified automatic transmission of claim 4, wherein the first orifice and the second orifice are round and have diameters between approximately 0.02 inches and approximately 0.09 inches.

6. The modified automatic transmission of claim 5, wherein the accumulator orifice plate is between 0.020 inches and approximately 0.035 inches thick.

7. The modified automatic transmission of claim 5, wherein the accumulator orifice plate is made from a material selected from the group consisting of cold roll steel and aluminum.

8. The modified automatic transmission of claim 1, wherein the second valve is an Electronic Pressure Control (EPC) accumulator valve.

9. A modified automatic transmission comprising:
   an automatic transmission main pump;
   a second gear band servo;
   second gear bands actuated by the second gear band servo;
   a second gear drum selectively grasped and released by the second gear bands to shift the automatic transmission;
   an automatic transmission fluid flow under pressure pumped by the main pump;
   a second gear accumulator comprising;
      a first accumulator chamber inside the second gear accumulator; and
      a second accumulator chamber inside the second gear accumulator and separated from the first accumulator chamber and dividing the interior of the second gear accumulator into two mutually exclusive opposing volumes;
      a first passage in fluid communication with the first chamber; and
      a second passage in fluid communication with the second chamber;
   a control valve body including:
      a second gear shift valve;

a first fluid path carrying the automatic transmission fluid flow from the main pump to the shift valve;

a first controlled automatic transmission fluid flow controlled by the shift valve;

in-series second fluid path and third fluid path carrying the first controlled automatic transmission fluid flow from the shift valve to the second gear band servo;

a fourth fluid path in-series with the second fluid path and the first passage and carrying the first controlled automatic transmission fluid flow from the shift valve to the first accumulator chamber;

an Electronic Pressure Control (EPC) accumulator valve;

a fifth fluid path carrying the automatic transmission fluid flow from the main pump to the EPC accumulator valve;

a second controlled automatic transmission fluid flow controlled by the EPC accumulator valve; and a sixth fluid path in fluid communication with the second passage and carrying the second controlled automatic transmission fluid flow from the EPC accumulator valve to the second accumulator chamber;

an accumulator orifice plate residing between the second gear accumulator and the control valve body and including:

a first orifice aligned with the first passage and having a first diameter between approximately 0.02 inches and approximately 0.09 inches to restrict the flow of the first controlled automatic transmission fluid into the first chamber; and a second orifice aligned with the second passage and having a second diameter between approximately 0.02 inches and approximately 0.09 inches to restrict the flow of the second controlled automatic transmission fluid into the second chamber.

10. A method for modifying an automatic transmission to match shifting characteristics to a driver's preferences, the method including:

removing an oil pan from an automatic transmission to expose a control valve body;

removing fasteners attaching a second gear accumulator to the control valve body;

removing the second gear accumulator from the control valve body to expose first and second passages between the control valve body and the second gear accumulator;

positioning an accumulator orifice plate between the second gear accumulator and the control valve body to align first and second orifices with the passages;

repositioning the second gear accumulator against the control valve body;

reattaching the fasteners to hold the second gear accumulator and accumulator orifice plate in position; and reattaching the automatic transmission oil pan.

* * * * *